US010411580B2

(12) United States Patent
Froelich

(10) Patent No.: US 10,411,580 B2
(45) Date of Patent: Sep. 10, 2019

(54) ELECTROMAGNETIC OSCILLATOR WITH ELECTRICAL AND MECHANICAL OUTPUT

(71) Applicant: Michael J. Froelich, North Canton, OH (US)

(72) Inventor: Michael J. Froelich, North Canton, OH (US)

(*) Notice: Subject to any disclaimer, the term of this patent is extended or adjusted under 35 U.S.C. 154(b) by 351 days.

(21) Appl. No.: 15/418,132

(22) Filed: Jan. 27, 2017

(65) Prior Publication Data

US 2017/0141645 A1    May 18, 2017

Related U.S. Application Data

(60) Continuation-in-part of application No. 14/283,600, filed on May 21, 2014, now Pat. No. 9,564,793, which is a division of application No. 13/042,558, filed on Mar. 8, 2011, now Pat. No. 8,760,020, which is a continuation-in-part of application No. 11/977,059, filed on Oct. 23, 2007, now Pat. No. 7,911,096.

(60) Provisional application No. 60/857,944, filed on Nov. 9, 2006.

(51) Int. Cl.
*H02K 35/00* (2006.01)
*H02K 53/00* (2006.01)

(52) U.S. Cl.
CPC ............ *H02K 53/00* (2013.01); *H02K 35/00* (2013.01)

(58) Field of Classification Search
CPC .......... H02K 7/065; H02K 7/06; H02K 7/003; H02K 7/1892; H02K 35/00

USPC ........................................ 310/20, 80; 29/596
See application file for complete search history.

(56) References Cited

U.S. PATENT DOCUMENTS

| | | |
|---|---|---|
| 3,108,163 A | 10/1963 | Kripke et al. |
| 3,899,703 A | 8/1975 | Kinnison |
| 3,967,146 A | 6/1976 | Howard |
| 4,169,983 A | 10/1979 | Felder |
| 4,179,633 A | 12/1979 | Kelly |
| 4,300,067 A | 11/1981 | Schumann |
| 4,352,023 A | 9/1982 | Sachs et al. |
| 4,751,486 A | 6/1988 | Minato |
| 5,405,251 A | 4/1995 | Sipin |
| 6,084,322 A | 7/2000 | Rounds |
| 6,781,270 B2 | 8/2004 | Long |
| 7,024,963 B2 | 4/2006 | French |
| 7,151,332 B2 | 12/2006 | Kundel |
| 7,382,106 B2 | 6/2008 | Kundel |
| 7,385,325 B2 | 6/2008 | Tkadlec |

(Continued)

*Primary Examiner* — Hanh N Nguyen
(74) *Attorney, Agent, or Firm* — Sand, Sebolt & Wernow Co., LPA

(57) ABSTRACT

An oscillator typically includes a rotatable drive shaft, at least two pivot members which rotate with the drive shaft, at least one oscillating member which is pivotable back and forth in an oscillating manner and at least one rod mounted on the at least one oscillating member which is movable in response to rotational and pivotal movement of the at least two pivot members so as to cause the oscillating member to pivot back and forth in an oscillating manner. At least one rotatable drive wheel may drive rotatable movement of the drive shaft. A drive mechanism may be used to drive rotation of the at least one drive wheel. At least one generating magnet may be mounted on the oscillating member and movable adjacent an electrically conductive coil for producing an electric current therein.

20 Claims, 9 Drawing Sheets

(56) References Cited

U.S. PATENT DOCUMENTS

| | | | |
|---|---|---|---|
| 7,569,952 B1 * | 8/2009 | Bono | ............... H05K 35/02 310/15 |
| 8,760,020 B2 | 6/2014 | Froelich | |
| 2002/0167235 A1 | 11/2002 | Long | |
| 2004/0041479 A1 | 3/2004 | French | |
| 2004/0140722 A1 | 7/2004 | Long | |
| 2007/0210659 A1 | 9/2007 | Long | |
| 2011/0248580 A1 | 10/2011 | Powers | |

* cited by examiner

ELECTROMAGNETIC OSCILLATOR WITH ELECTRICAL AND MECHANICAL OUTPUT

CROSS REFERENCE TO RELATED APPLICATIONS

This application is a continuation-in-part of U.S. patent application Ser. No. 14/283,600, filed May 21, 2014; which is a divisional of U.S. patent application Ser. No. 13/042,558, filed Mar. 8, 2011, now U.S. Pat. No. 8,760,020; which is a continuation-in-part of U.S. patent application Ser. No. 11/977,059, filed on Oct. 23, 2007, now U.S. Pat. No. 7,911,096; which claims priority from U.S. Provisional Patent Application Ser. No. 60/857,944, filed Nov. 9, 2006; the disclosures of which are incorporated herein by reference.

BACKGROUND OF THE INVENTION

Technical Field

The present invention relates generally to the generation of electricity and the production of mechanical output. More particularly, the invention relates to a higher efficiency generation of electrical power.

Background Information

The efficient generation of electrical current and its use for driving mechanical motion which creates the electrical current has been a long sought after goal. While the loss of energy in accordance with the second law of thermodynamics is well known, nonetheless there is always room for improvement in seeking a higher efficiency in such a device. The present invention provides such an improvement.

SUMMARY

In one aspect, the disclosure may provide an apparatus comprising a rotatable drive shaft, at least two pivot members which rotate with the drive shaft, at least one oscillating member which is pivotable back and forth in an oscillating manner and at least one rod mounted on the at least one oscillating member which is movable in response to rotational and pivotal movement of the at least two pivot members so as to cause the oscillating member to pivot back and forth in an oscillating manner.

In another aspect, the disclosure may provide a method of generating power comprising rotating a drive shaft, oscillating at least one oscillating member, moving at least one generating magnet through at least one electrically conductive member and generating electricity from the oscillating movement of the at least one generating magnet. The oscillation of the at least one oscillating member is accomplished by pivoting at least two pivot members into contact with the at least one oscillating member so as to oscillate the at least one oscillating member.

In another aspect, the disclosure may provide an oscillator which typically includes a rotatable drive shaft, at least two pivot members which rotate with the drive shaft, at least one oscillating member which is pivotable back and forth in an oscillating manner and at least one rod mounted on the at least one oscillating member which is movable in response to rotational and pivotal movement of the at least two pivot members so as to cause the oscillating member to pivot back and forth in an oscillating manner. At least one rotatable drive wheel may drive rotatable movement of the drive shaft. A drive mechanism may be used to drive rotation of the at least one drive wheel. At least one generating magnet may be mounted on the oscillating member and movable adjacent an electrically conductive coil for producing an electric current therein.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
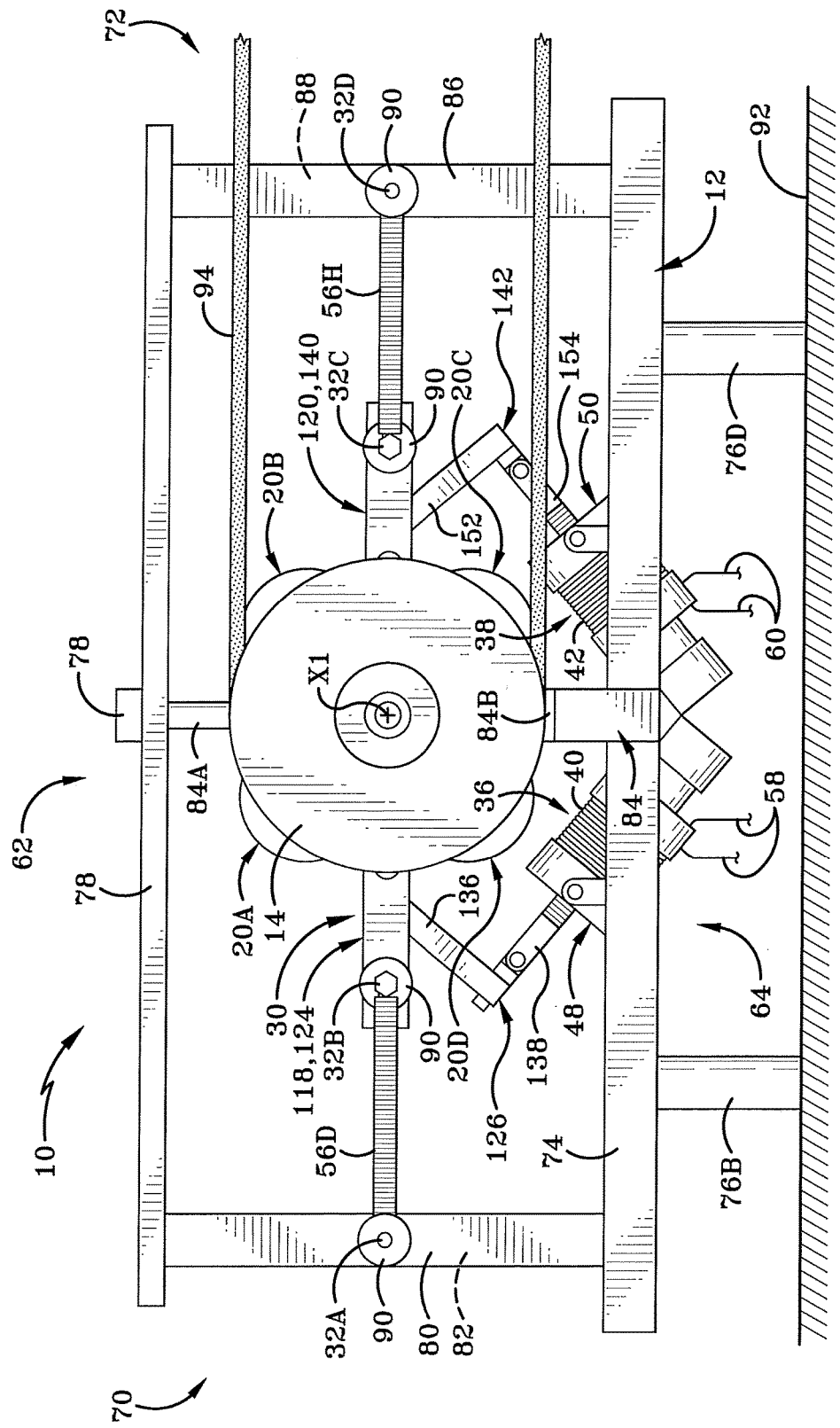
FIG. 1 (FIG. 1) is a front elevational view of the oscillator of the present disclosure.
Figure 2:
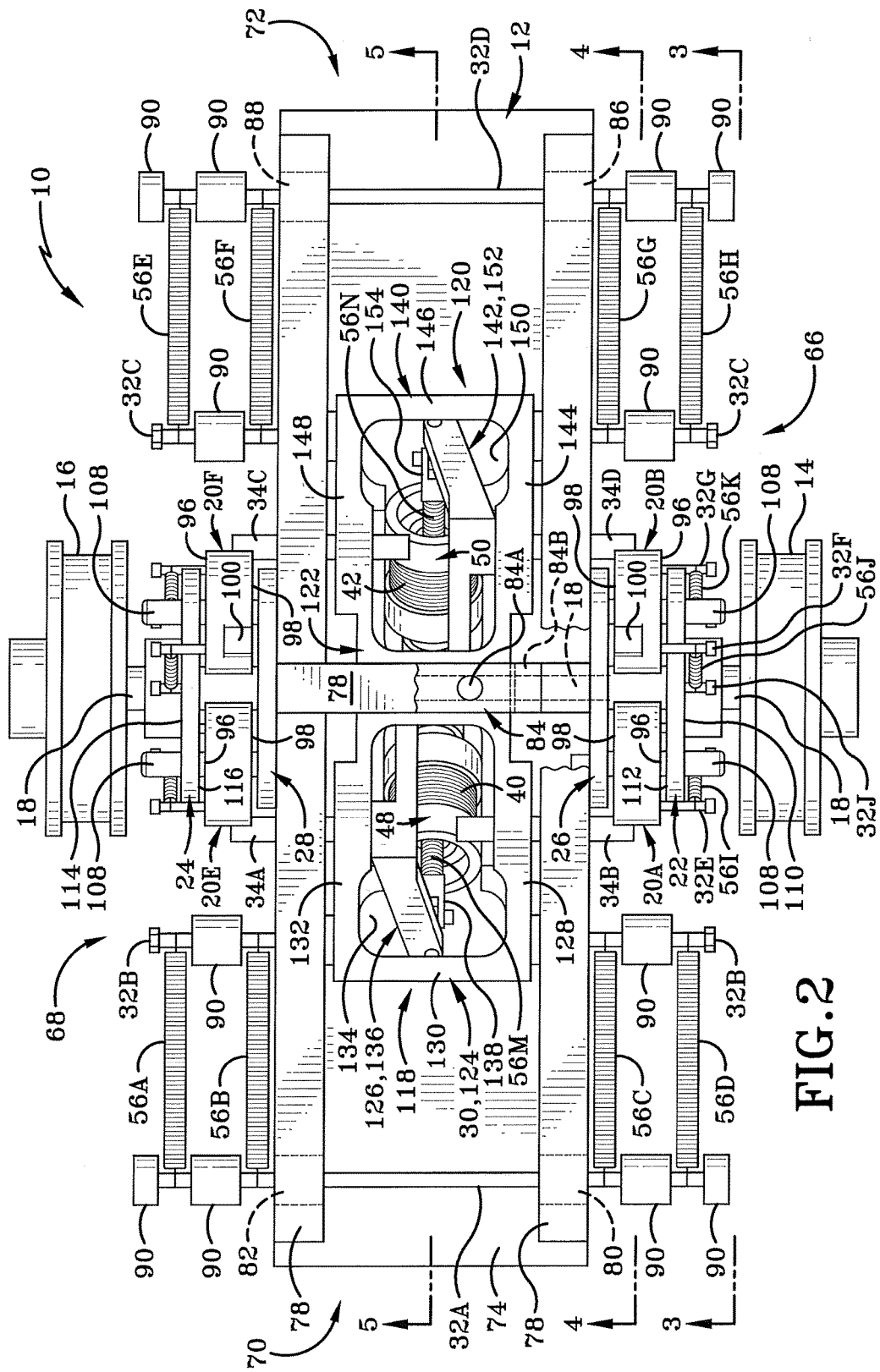
FIG. 2 (FIG. 2) is a top plan view of the oscillator.

In accordance with one aspect of the present disclosure, and as depicted in FIGS. 1-2, an electrical power generating oscillator is broadly depicted as 10. Oscillator 10 is configured to be driven by a drive mechanism to create mechanical motion which generates electricity. More particularly, oscillator 10 includes a frame 12, at least one drive mechanism (not shown), first and second drive wheels 14 and 16, a drive shaft 18, a plurality of pivot members 20A, 20B, 20C, 20D, 20E, 20F, 20G and 20H, a first front mounting plate 22, a second front mounting plate 24, a first rear mounting plate 26, a second rear mounting plate 28, at least one oscillating member 30, a plurality of mounting rods 32A, 32B, 32C, 32D, 32E, 32F, 32G, 32H, 32I, 32J, 32K and 32L, a plurality of pivot rods 34A, 34B, 34C and 34D, first and second coil mounts 36 and 38, first and second electrically conductive coils 40 and 42, first and second generating magnets 44 and 46, first and second magnet mounts 48 and 50, first and second repelling magnets 52 and 54, a plurality of coil springs 56A, 56B, 56C, 56D, 56E, 56F, 56G, 56H, 56I, 56J, 56K, 56L, 56M and 56N and first and second electrical outputs 58 and 60. Coil springs 56A, 56B, 56C, 56D, 56E, 56F, 56G, 56H, 56I, 56J, 56K, 56L, 56M and 56N may also be referred to as biasing mechanisms 56A, 56B, 56C, 56D, 56E, 56F, 56G, 56H, 56I, 56J, 56K, 56L, 56M and 56N.

Figure 5:
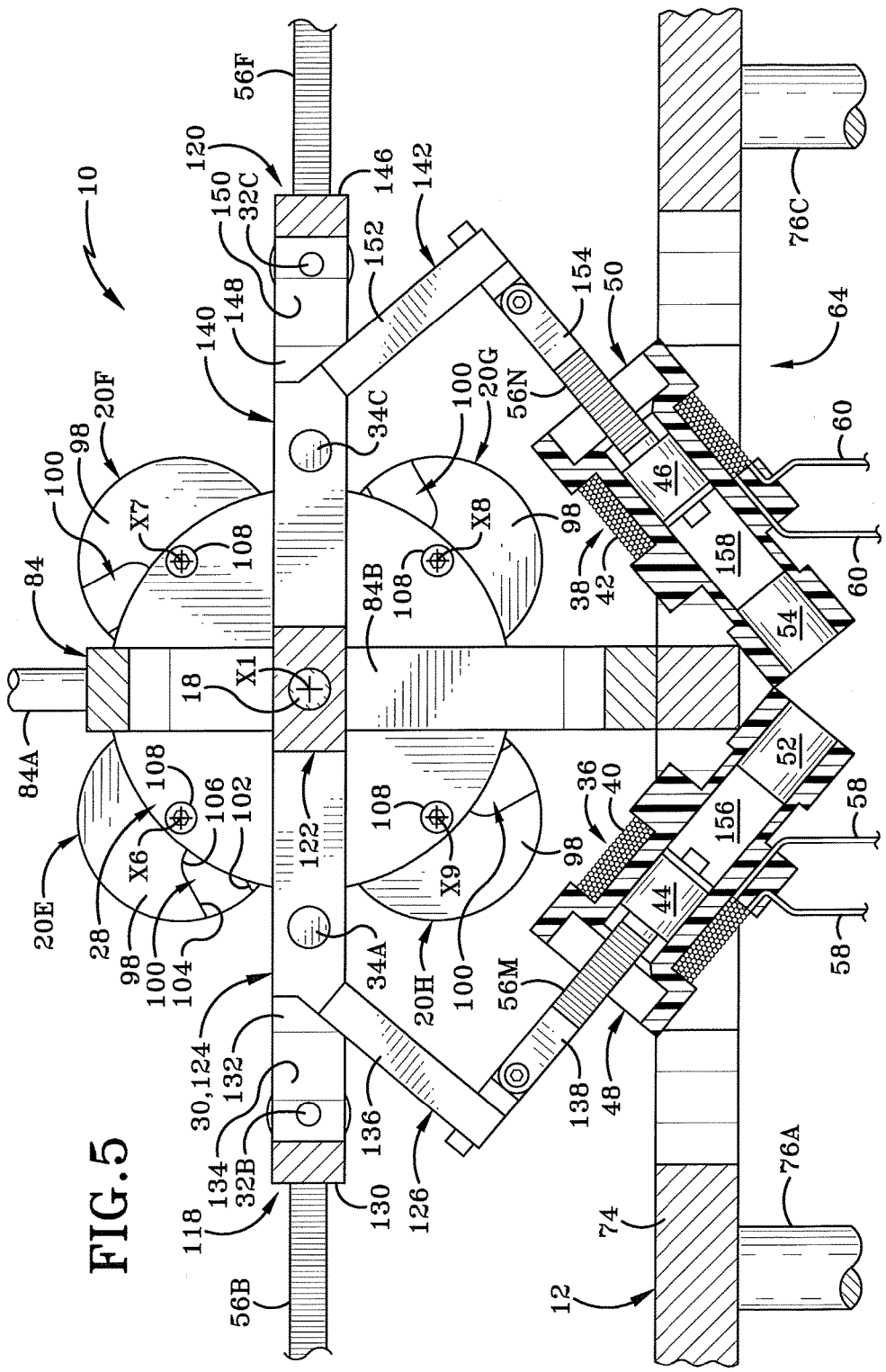
FIG. 5 (FIG. 5) is a sectional view taken on line 5-5 of FIG. 2.

The frame 12 includes a top 62 and a bottom 64 defining therebetween a vertical direction, a front side 66 and a rear side 68 defining therebetween an axial direction and a left and right opposed sides 70 and 72 defining therebetween a longitudinal direction (FIG. 1). Frame 12 includes a base 74 adjacent bottom 64. Frame 12 further includes first, second, third and fourth base support members 76A, 76B, 76C and 76D (FIG. 1 and FIG. 5) which project downwardly from and are rigidly mounted on base 74 (FIG. 1 and FIG. 5). Frame 12 includes an upper portion 78 adjacent top 62. Frame 12 includes a front left support 80, a rear left support 82 (dashed-lead lines in FIG. 1 represent the rear left support 82), a middle support 84, a front right support 86 and a rear right support 88 (dashed-lead lines in FIG. 1 represent the rear right support 88). The front left support 80, rear left support 82, front right support 86 and rear right support 88 each form a centrally located axially extending aperture which extends fully through each of the front left supports 80, the rear left support 82, the front right support 86 and the rear right support 88. The axially extending apertures on the front left support 80 and rear left support 82 are configured to rigidly secure the mounting rod 32A. Weights 90 are disposed on the mounting rod 32A to act as spacers and to provide weight to assist the coil springs 56A, 56B, 56C and 56D in harmonic oscillation. The axially extending apertures on the front right support 86 and the rear right support 88 are configured to rigidly secure the mounting rod 32D. Weights 90 are disposed on the mounting rod 32D to act as spacers and to provide weight to assist the coil springs 56E, 56F, 56G and 56H in harmonic oscillation. Coil springs 56A, 56B, 56C, 56D, 56E, 56F, 56G and 56H may be used to control the oscillating movement of the at least one oscillating member 30. It is noted that any suitable weight and/or spacer mechanism may be utilized to provide proper spacing between coil springs and proper weight balance as one of ordinary skill in the art would understand. The frame 12 is securely mounted on a support surface 92 so that frame 12 will remain stationary during operation.

The middle support 84 includes a first portion 84A, a second portion 84B (dashed-lead lines in FIG. 2 represent the second portion 84B) and a third portion (not shown). The first portion 84A is connected to the second portion 84B. The first portion 84A projects downwardly from and is rigidly mounted to the upper portion 78 and the second portion 84B. The second portion 84B projects upwardly from and is rigidly mounted to the base 74 and the first portion 84A. The second portion 84B forms a centrally located axially extending aperture which extends fully through the second portion 84B. The centrally located axially extending aperture of the second portion 84B is configured to rotatably receive the drive shaft 18 and to support the drive shaft 18. The second portion 84B is disposed between the first rear mounting plate 26 and the middle portion 122 of the oscillating member 30. The third portion of the middle support 84 is substantially identical to the second portion 84B of the middle support 84 except that the third portion is disposed between the middle portion 122 of the oscillating member 30 and the second rear mounting plate 28. Thus the centrally located axially extending aperture of the second portion 84B is in alignment with the centrally located axially extending aperture of the third portion.

The drive shaft 18 is rigid and may be axially elongated. The drive shaft 18 extends from adjacent the front side 66 of the frame 12 to adjacent the rear side 68 of the frame 12 through respective apertures, as further describe below, formed in each of the drive wheels 14 and 16, the first front mounting plate 22, the second front mounting plate 24, the first rear mounting plate 26, the second rear mounting plate 28 and the oscillating member 30 as shown in FIG. 2. The drive shaft 18 is supported by the second portion 84B and the third portion (not shown) of the middle support 84.

The drive mechanism (not shown) includes a rotational output which is coupled to at least one of the first and second drive wheels 14 and 16 respectively. In one embodiment according to the present disclosure, the drive mechanism includes a drive belt 94 configured to couple with at least one of the first and second drive wheels 14 and 16 respectively. The first drive wheel 14 is rotatably secured to the drive shaft 18 adjacent the front side 66 of the frame 12 as depicted in FIG. 2. The second drive wheel 16 is rotatably secured to the drive shaft 18 adjacent the rear side 68 of the frame 12 as depicted in FIG. 2. The first and second drive wheels 14 and 16 are rotatable with the rotational output about a horizontal axially extending axis X1. The drive mechanism may be any suitable drive mechanism which may be used to drive the rotation of at least one of the drive wheels 14 and 16. For example, and not meant to be limiting, the drive mechanism may be an electric motor or the like. Further, the drive mechanism may be powered by any suitable source of power, such as electric, water, wind, geothermal, solar and so forth.

Figure 4:
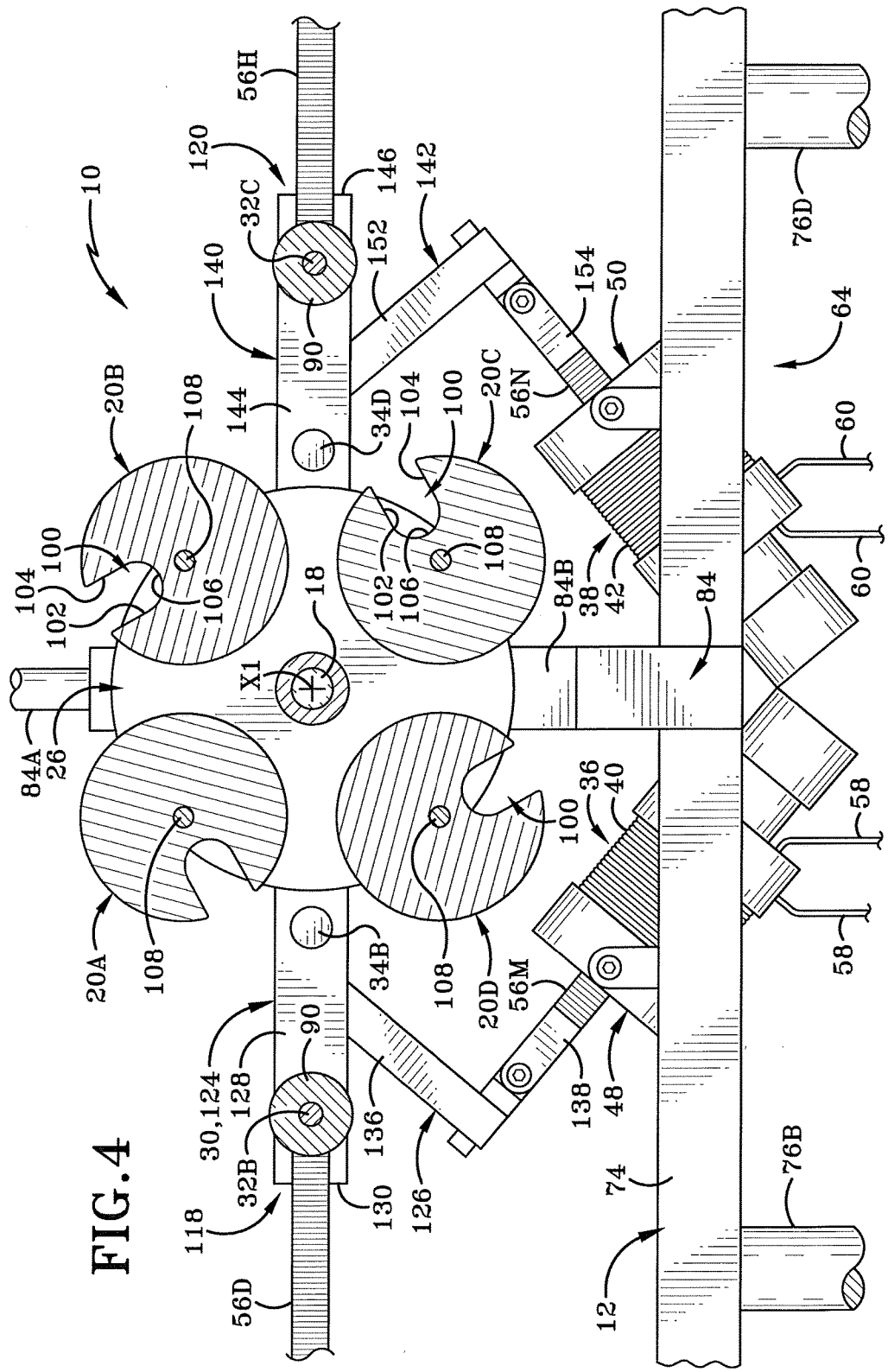
FIG. 4 (FIG. 4) is a sectional view taken on line 4-4 of FIG. 2.

In one embodiment according to the present disclosure, the pivot members 20A, 20B, 20C and 20D are located between the first front mounting plate 22 and the first rear mounting plate 26 and are carried by the first front mounting plate 22 and the first rear mounting plate 26. The pivot members 20E, 20F, 20G and 20H are located between the second front mounting plate 24 and the second rear mounting plate 28 and are carried by the second front mounting plate 24 and the second rear mounting plate 28. In one embodiment according to the present disclosure, the pivot members 20A, 20B, 20C, 20D, 20E, 20F, 20G and 20H are substantially identical and revolve about axis X1. Pivot member 20A is in diametrical opposition to pivot member 20C, pivot member 20B is in diametrical opposition to pivot member 20D, pivot member 20E is in diametrical opposition to pivot member 20G and pivot member 20F is in diametrical opposition to pivot member 20H as depicted in FIG. 4 and FIG. 5.

Figure 3:
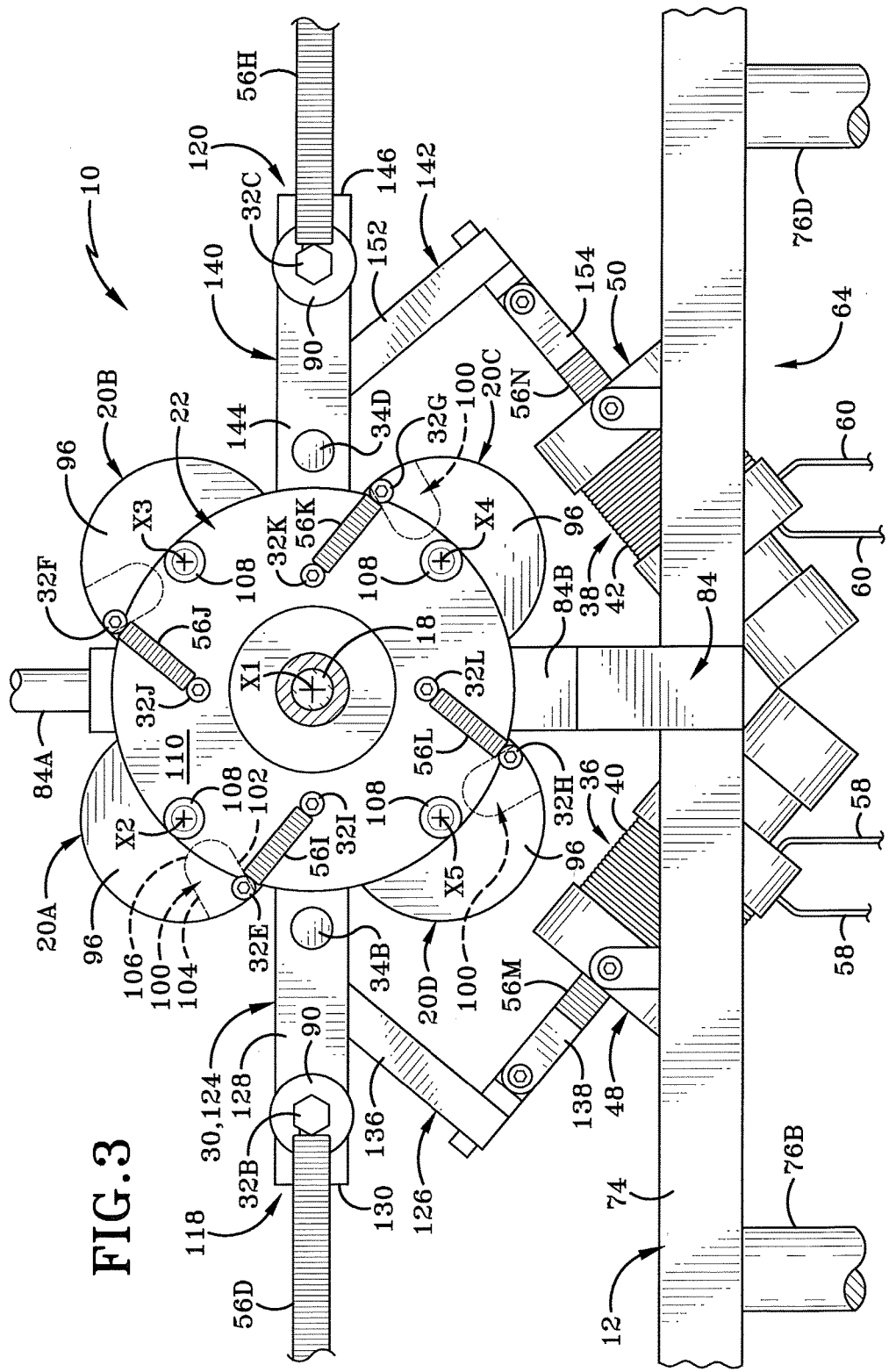
FIG. 3 (FIG. 3) is a sectional view taken on line 3-3 of FIG. 2.

Each pivot member 20A, 20B, 20C, 20D, 20E, 20F, 20G and 20H is generally circular in shape and includes a first and second sidewall 96 and 98. Each pivot member 20A, 20B, 20C, 20D, 20E, 20F, 20G and 20H defines a U-shaped recess 100 formed in the second sidewall 98 where the U-shaped recess 100 extends at least partially into the second sidewall 98 in an axial direction (FIG. 2). The U-shaped recess 100 includes a first, second and third side 102, 104 and 106 (FIG. 3). Although the pivot members 20A, 20B, 20C, 20D, 20E, 20F, 20G and 20H in this embodiment are circular and form U-shaped recesses 100, the pivot members 20A, 20B, 20C, 20D, 20E, 20F, 20G and 20H and recesses formed in the pivot members 20A, 20B, 20C, 20D, 20E, 20F, 20G and 20H may be any suitable shape as one of ordinary skill in the art would understand.

Each pivot member 20A, 20B, 20C, 20D, 20E, 20F, 20G and 20H forms a centrally located axially extending aperture which extends fully through the first and second sidewall 96 and 98 for receiving securing mechanisms 108 as further described below. Securing mechanisms 108 may be any suitable securing mechanism such as a rod and screws, pins or the like. The pivot member 20A is rotatable about an axially extending axis X2. The second axis X2 is eccentric to the first axis X1 (FIG. 3). The pivot member 20B is rotatable about an axially extending axis X3. The third axis X3 is eccentric to the first axis X1 (FIG. 3). The pivot member 20C is rotatable about an axially extending axis X4. The fourth axis X4 is eccentric to the first axis X1 (FIG. 3). The pivot member 20D is rotatable about an axially extending axis X5. The fifth axis X5 is eccentric to the first axis X1 (FIG. 3). The pivot member 20E is rotatable about an axially extending axis X6. The sixth axis X6 is eccentric to the first axis X1 (FIG. 5). The pivot member 20F is rotatable about an axially extending axis X7. The seventh axis X7 is eccentric to the first axis X1 (FIG. 5). The pivot member 20G is rotatable about an axially extending axis X8. The eighth axis X8 is eccentric to the first axis X1 (FIG. 5). The pivot member 20H is rotatable about an axially extending axis X9. The ninth axis X9 is eccentric to the first axis X1 (FIG. 5).

Each pivot member 20A, 20B, 20C, 20D, 20E, 20F, 20G and 20H forms an axially extending aperture which extends fully through the first sidewall 96 substantially near the first side 102 of the U-shaped recess 100 for rigidly receiving mounting rods 32E, 32F, 32G and 32H as further described below.

As depicted in FIG. 2, the first front mounting plate 22 is generally circular and includes a front side 110 and a rear side 112. The first front mounting plate 22 forms an outer set of axially extending apertures. The apertures extend axially fully through the front side 110 and the rear side 112 and are configured to rotatably receive the securing mechanisms 108. The first front mounting plate 22 defines a centrally located axially extending aperture configured to rotatably receive the drive shaft 18. The first front mounting plate 22 includes a set of mounting rods 32I, 32J, 32K and 32L as shown in FIG. 3 to rigidly secure biasing mechanisms, which may be coil springs 56I, 56J, 56K and 56L as further described below, or any other suitable biasing mechanism. The first front mounting plate 22 is rotatably secured to drive shaft 18 and is rotatable as further described below.

As depicted in FIG. 2, The second front mounting plate 24 is generally circular and includes a front side 114 and a rear side 116. The second front mounting plate 24 forms an outer set of axially extending apertures. The apertures extend axially fully through the front side 114 and the rear side 116 and are aligned with the axially extending outer apertures of the first front mounting plate 22 and the centrally located axially extending apertures of the pivot members 20A, 20B, 20C and 20D and are configured to rotatably receive the securing mechanisms 108. The second front mounting plate 24 defines a central axially extending aperture to rotatably receive the drive shaft 18. The second front mounting plate 24 is rotatably secured to drive shaft 18 and is rotatable as further described below.

As depicted in FIG. 2, the pivot members 20A, 20B, 20C and 20D are rotatably secured between the first front mounting plate 22 and the first rear mounting plate 26. For example, and with reference to FIG. 3, the securing mechanisms 108 extend through the axially extending outer apertures of the first front mounting plate 22, the centrally located axially extending apertures of the pivot members 20A, 20B, 20C and 20D and the outer set of axially extending apertures of the first rear mounting plate 26 to rotatably secure the pivot members 20A, 20B, 20C and 20D between the first front mounting plate 22 and the first rear mounting plate 26.

With continued reference to FIG. 3, mounting rods 32E, 32F, 32G and 32H are rigidly secured within the axially extending apertures which extend through the first sidewall 96 substantially near the first side 102 of the U-shaped recess 100. Mounting rod 32E is in diametrical opposition with mounting rod 32G. Mounting rod 32F is in diametrical opposition with mounting rod 32H. Mounting rod 32I is in diametrical opposition to mounting rod 32K. Mounting rod 32J is in diametrical opposition to mounting rod 32L.

With continued reference to FIG. 3, coil spring 56I is mounted with its first end on the mounting rod 32E and its second end on the mounting rod 32I. Coil spring 56J is mounted with its first end on the mounting rod 32F and its second end on the mounting rod 32J. Coil spring 56K is mounted with its first end on the mounting rod 32G and its second end on the mounting rod 32K. Coil spring 56L is mounted with its first end on the mounting rod 32H and its second end on the mounting rod 32L. The coils springs 56I, 56J, 56K and 56L are typically formed of spring metal.

Figure 6:
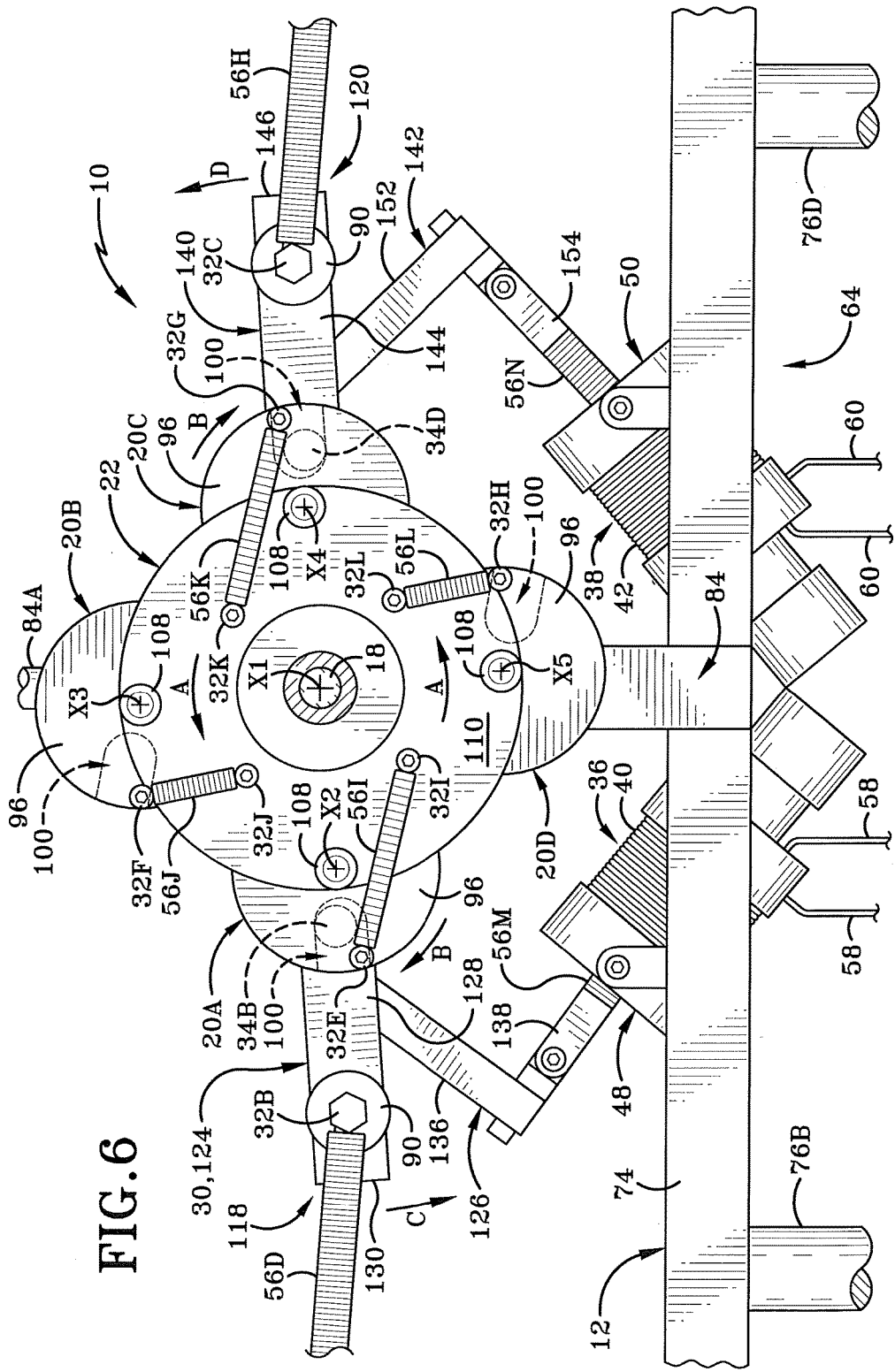
FIG. 6 (FIG. 6) is an operational view showing the first front mounting plate and the movement of the oscillating member in one direction.

The pivot members 20A, 20B, 20C and 20D are rotatable along axial axes X2, X3, X4 and X6 respectively between a resting position shown in FIG. 3 and an extended position shown by pivot members 20A and 20C in FIG. 6. The coil springs 56I, 56J, 56K and 56L bias the pivot members 20A, 20B, 20C and 20D to their resting positions.

The second front mounting plate 24 is substantially identical to the first front mounting plate 22. The second rear mounting plate 28 is substantially identical to the first rear mounting plate 26. The second front mounting plate 24 and the second rear mounting plate 28 rotatably secure pivot members 20E, 20F, 20G and 20H in a similar manner as the first front mounting plate 22 and the first rear mounting plate 26 rotatably secure pivot members 20A, 20B, 20C and 20D. Therefore, the second front mounting plate 24 and the second rear mounting plate 28 utilize the same components including four securing mechanisms (not shown), eight mounting rods (not shown) and four coil springs (not shown) to rotatably secure the pivot members 20E, 20F, 20G and 20H.

The oscillating member 30 is described in further detail with reference to FIGS. 1, 2 and 5. Oscillating member 30 is weight balanced about axis X1 in order to provide oscillation about axis X1 which is as smooth as possible. In one embodiment according to the present disclosure, weights 90 may be disposed on mounting rods 32B and 32C respectively to provide this weight balance. Further, the oscillating member 30 includes first and second sides 118 and 120 having equal weights to further provide this weight balance. The oscillating member 30 further includes a middle portion 122 disposed between first and second sides 118 and 120 of the oscillating member 30.

The middle portion 122 defines an axially extending aperture that extends fully through the middle portion 122. The axially extending aperture is configured to rotatably receive the drive shaft 18.

First side 118 includes an upper portion 124 and an L-shaped lower portion 126. In one embodiment according to the present disclosure, the upper portion 124 of the first side 118 includes a first portion 128, a second portion 130 and a third portion 132 (FIG. 3). A vertically extending aperture 134 is formed between the middle portion 122 of the oscillating member 30 and the first, second and third portions 128, 130 and 132 of the upper portion 124 of the first side 118 as depicted in FIG. 2. The upper portion 124 further defines axially extended apertures (not shown) formed in the first portion 128 and the third portion 132. The apertures extend axially fully through the first portion 128 and the third portion 132. The axially extending apertures are configured to rigidly secure the pivot rods 34A and 34B. Pivot rod 34B is configured to contact the U-shaped recesses 100 of the pivot members 20A, 20B, 20C and 20D. Pivot rod 34A is configured to contact the U-shaped recesses 100 of the pivot members 20E, 20F, 20G and 20H. The axially extending apertures are further configured to rigidly secure the mounting rod 32B as further described below.

The L-shaped lower portion 126 of the first side 118 includes an upper leg 136 and a lower leg 138 as depicted in FIGS. 1 and 5. More particularly, upper leg 136 angles downwardly and longitudinally outward towards the left side 70 of the frame 12 from the upper portion 124 as depicted in FIG. 5. In other words, the upper leg 136 extends radially outwardly from axis X1. The lower leg 138 angles downwardly and longitudinally inwardly towards the right side 72 of the frame 12 from the outer end of upper leg 136 towards the first magnet mount 48 as depicted in FIG. 5 and as further described below. In other words, the lower leg 138 extends radially inwardly toward the axis X1.

With continued reference to FIG. 3, coil spring 56M is mounted with its first end on the outer end of the lower leg 138 and the first generating magnet 44 is attached to the second end of the coil spring 56M. Coil spring 56M is typically formed of spring metal. The coil spring 56M biases the first generating magnet 44 as the first generating magnet 44 moves through the electrically conductive member, shown as the first and second electrically conductive coils 40 and 42 respectively and as further described below. The electrically conductive member, shown as first electrically conductive coil 40 includes a coil circumscribing a space and the first generating magnet 44 is oscillatingly movable within the space. The electrically conductive member may be an electromagnetic coil such as a wire or any suitable electrically conductive member as one of ordinary skill in the art would understand.

Second side 120 includes an upper portion 140 and an L-shaped lower portion 142. In one embodiment according to the present disclosure, the upper portion 140 of the second side 120 includes a first portion 144, a second portion 146 and a third portion 148 (FIG. 3). A vertically extending aperture 150 is formed between the middle portion 122 of the oscillating member 30 and the first, second and third portions 144, 146 and 148 of the upper portion 140 of the second side 120 as depicted in FIG. 2. The upper portion 140 further defines axially extended apertures (not shown) formed in the first portion 144 and the third portion 148. The apertures extend axially fully through the first portion 144 and the third portion 148. The axially extending apertures are configured to rigidly secure the pivot rods 34C and 34D. Pivot rod 34D is configured to contact the U-shaped recesses 100 of the pivot members 20A, 20B, 20C, 20D. Pivot rod 34C is configured to contact the U-shaped recesses 100 of the pivot members 20E, 20F, 20G and 20H. The axially extending apertures are further configured to rigidly secure the mounting rod 32C as further described below.

The L-shaped lower portion 142 of the second side 120 includes an upper leg 152 and a lower leg 154 as depicted in FIGS. 1 and 5. More particularly, upper leg 152 angles downwardly and longitudinally outwardly towards the right side 72 of the frame 12 from the upper portion 140 as depicted in FIG. 5. In other words, the upper leg 152 extends radially outwardly from axis X1. The lower leg 154 angles downwardly and longitudinally inwardly towards the left side 70 of the frame 12 from the outer end of upper leg 152 towards the second magnet mount 50 as depicted in FIG. 5 and as further described below. In other words, the lower leg 154 extends radially inwardly toward the axis X1.

With continued reference to FIG. 3, coil spring 56N is mounted with its first end on the outer end of the lower leg 154 and the second generating magnet 46 is attached to the second end of the coil spring 56N. Coil spring 56N is typically formed of spring metal. The coil spring 56N biases the second generating magnet 46 as the second generating magnet 46 moves through the second electrically conductive coil 42 as further described below. The electrically conductive member, shown as the second electrically conductive coil 42 includes a coil circumscribing a space and the second generating magnet 46 is oscillatingly movable within the space.

Figure 7:
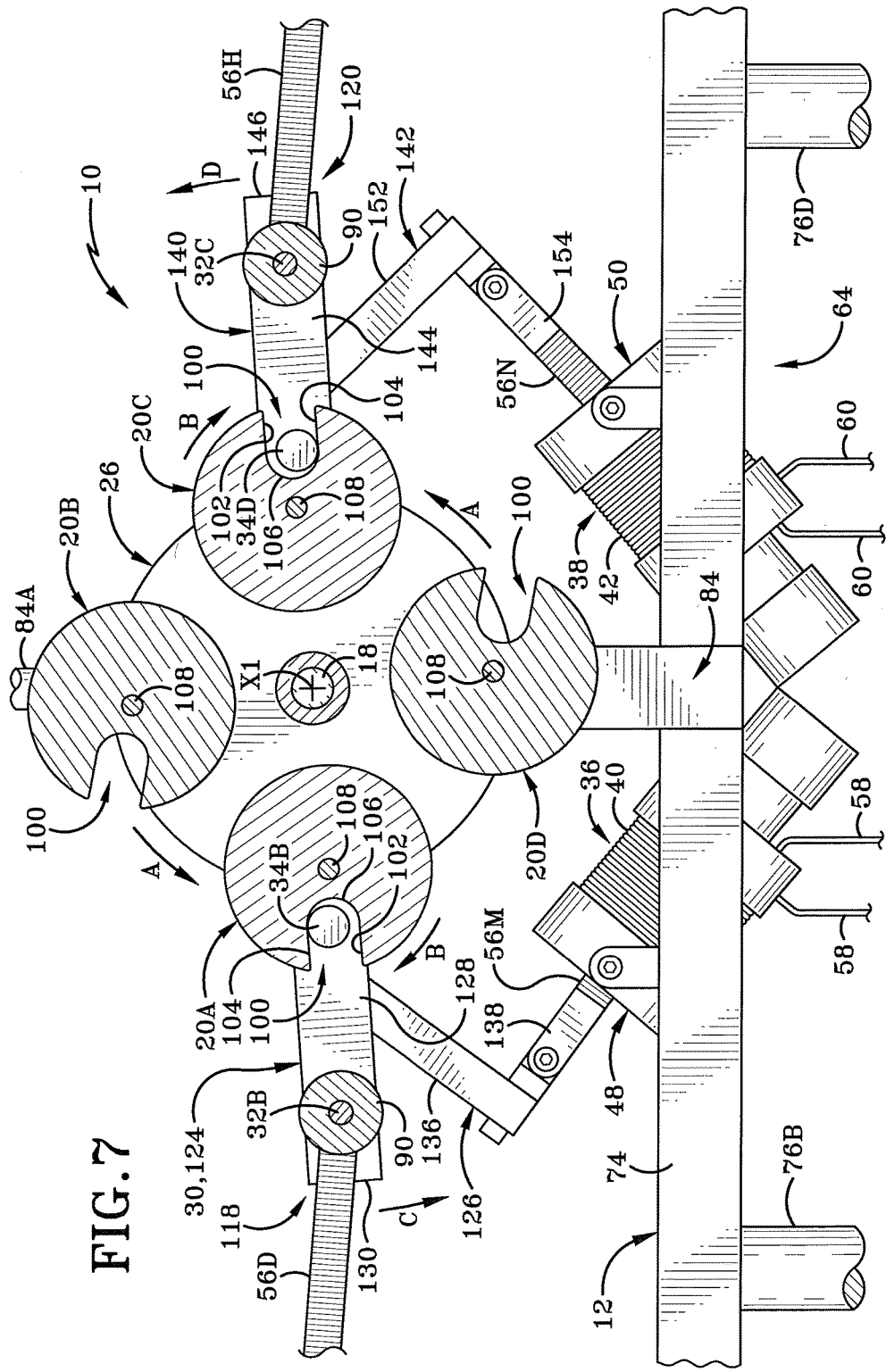
FIG. 7 (FIG. 7) is an operational view with the first front mounting plate removed showing the movement of the oscillating member in one direction.
Figure 8:
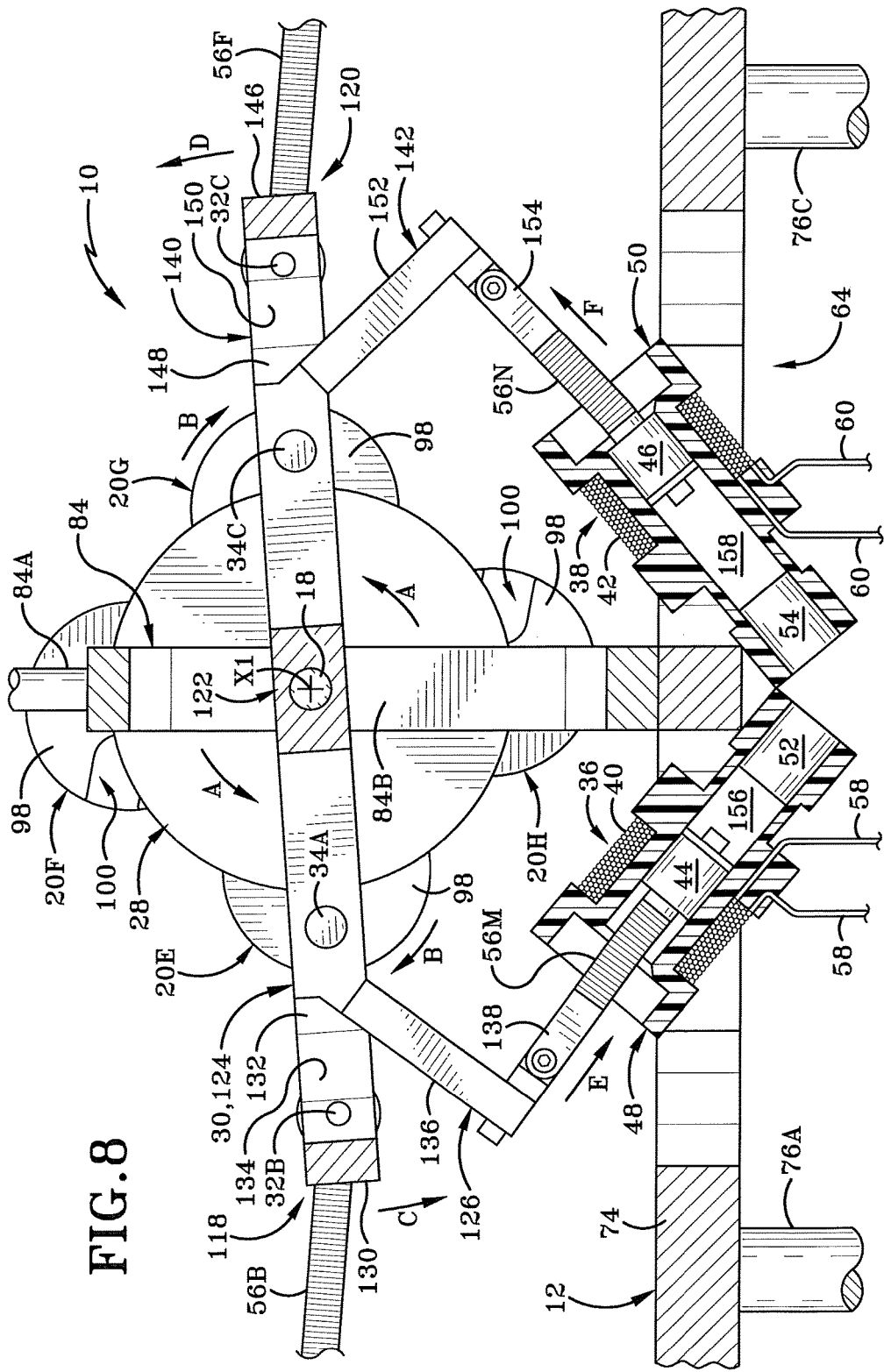
FIG. 8 (FIG. 8) is an operational view with a sectional view of the magnet mounts, coil mounts and the electrically conductive members showing the movement of the oscillating member and the generating magnets.

With reference to FIG. 2, coil spring 56A is mounted with its first end on the mounting rod 32A and its second end on the mounting rod 32B. Coil spring 56B is mounted with its first end on the mounting rod 32A and its second end on the mounting rod 32B. Coil spring 56C is mounted with its first end on the mounting rod 32A and its second end on the mounting rod 32B. Coil spring 56D is mounted with its first end on the mounting rod 32A and its second end on the mounting rod 32B. The coil springs 56A, 56B, 56C and 56D extend in a generally longitudinal direction between the left side 70 of the frame 12 and the right side 72 of the frame 12 and are generally parallel with one another. The coil springs 56A, 56B, 56C and 56D are typically formed of spring metal. The mounting rod 32B is pivotal about axis X1 between a resting position (FIG. 1 and FIG. 5) and an extended position (FIG. 6, FIG. 7 and FIG. 8). The coil springs 56A, 56B, 56C and 56D bias the mounting rod 32B to its resting position.

With reference to FIG. 2, coil spring 56E is mounted with its first end on the mounting rod 32C and its second end on the mounting rod 32D. Coil spring 56F is mounted with its first end on the mounting rod 32C and its second end on the mounting rod 32D. Coil spring 56G is mounted with its first end on the mounting rod 32C and its second end on the mounting rod 32D. Coil spring 56H is mounted with its first end on the mounting rod 32C and its second end on the mounting rod 32D. The coil springs 56E, 56F, 56G and 56H extend in a generally longitudinal direction between the left side 70 of the frame 12 and the right side 72 of the frame 12 and are generally parallel with one another. The coil springs 56E, 56F, 56G and 56H are typically formed of spring metal. The mounting rod 32C is pivotal about axis X1 between a resting position (FIG. 1 and FIG. 5) and an extended position (FIG. 6, FIG. 7 and FIG. 8). The coil springs 56E, 56F, 56G and 56H bias the mounting rod 32C to its resting position.

With reference to FIG. 5, the first magnet mount 48 is rigidly secured to base 74. The first magnet mount 48 includes the first coil mount 36. The first magnet mount 48 defines a generally cylindrical recess 156 configured for the first generating magnet 44 to pass through and further configured to mount the first repelling magnet 52 within the cylindrical recess 156 at the bottom of the cylindrical recess 156. The first electrically conductive coil 40 is mounted on the first coil mount 36. The first repelling magnet 52 is configured to repel the first generating magnet 44 to limit oscillating travel of the at least one oscillating member 30 in one direction.

With continued reference to FIG. 5, the second magnet mount 50 is rigidly secured to base 74. The second magnet mount 50 includes the second coil mount 38. The second magnet mount 50 defines a generally cylindrical recess 158 configured for the second generating magnet 46 to pass through and further configured to mount the second repelling magnet 54 within the cylindrical recess 158 at the bottom of the cylindrical recess 158. The second electrically conductive coil 42 is mounted on the second coil mount 38. The second repelling magnet 54 is configured to repel the second generating magnet 46 to limit oscillating travel of the at least one oscillating member 30 in one direction.

The operation of oscillator 10 is described with reference to FIG. 6, FIG. 7 and FIG. 8. In accordance with one embodiment of the present disclosure, drive mechanism (not shown) is activated which drives the drive belt 94. The drive belt 94 drives at least one of the first and second drive wheels 14 and 16 in order to rotate the drive shaft 18, the first front mounting plate 22, the first rear mounting plate 26, the second front mounting plate 24, the second rear mounting plate 28 and the pivot members 20A, 20B, 20C, 20D, 20E, 20F, 20G and 20H as shown at arrow A. In accordance with one embodiment of the present disclosure, the rotation of arrow A is counterclockwise. During the rotation of the first front mounting plate 22 and the first rear mounting plate 26, the pivot members 20A, 20B, 20C and 20D contact the pivot rods 34B and 34D. As the pivot members 20A, 20B, 20C and 20D contact the pivot rods 34B and 34D, the pivot members 20A, 20B, 20C and 20D pivot in a clockwise direction shown at arrow B. Further, during the rotation of the second front mounting plate 24 and the second rear mounting plate 28, the pivot members 20E, 20F, 20G and 20H contact the pivot rods 34A and 34C. As the pivot members 20E, 20F, 20G and 20H contact the pivot rods 34A and 34C, the pivot members 20E, 20F, 20G and 20H pivot in a clockwise direction shown at arrow B.

For example, and with reference to FIG. 6, as the U-shaped recess 100 of the pivot member 20A contacts the pivot rod 34B, the pivot rod 34B travels along the U-shaped recess 100. While the pivot rod 34B travels along the U-shaped recess 100, the coil spring 56L extends until the pivot rod 34B travels substantially along the entire contact surface of the U-shaped recess 100 at which point the pivot member 20A is in its extended position. As the pivot rod 34B disengages from the U-shaped recess 100, the coil spring 56L biases the pivot member 20D to its resting position. In one embodiment according to the present disclosure, as the first front mounting plate 22 and the first rear mounting plate 26 rotate, the securing mechanism 108 contacts the coil spring 56L which further extends the coil spring 56L before the coil spring 56L biases the pivot member 20A to its resting position.

Further, while the pivot rod 34B travels along the U-shaped recess 100, the first side 118 of the oscillating member 30 oscillates in a downward vertical direction between the top 62 of the frame 12 and the bottom 64 of the frame 12, shown at arrow C, until the pivot rod 34B travels substantially along the entire contact surface of the U-shaped recess 100 at which point the first side 118 is in its extended position. As the pivot rod 34B disengages from the U-shaped recess 100, the coil springs 56A, 56B, 56C and 56D bias the first side 118 of the oscillating member 30 towards its resting position. The same process repeats as the other pivot members 20B, 20C and 20D contact the pivot rod 34B.

With reference to FIG. 8, as the first side 118 of the oscillating member 30 oscillates in the downward vertical direction between the top 62 of the frame 12 and the bottom 64 of the frame 12, the lower leg 138 of the L-shaped lower portion 142 of the first side 118 moves in a downwardly and inwardly direction towards the right side 72 of the frame 12 from the outer end of upper leg 136 towards the first coil mount 36 as shown at arrow E. As the lower leg 138 of the L-shaped lower portion 142 of the first side 118 moves in direction E, the first generating magnet 44 moves through the first electrically conductive coil 40. As the first side 118 is biased towards its resting position, the first generating magnet 44 passes through the first electrically conductive coil 40 in the opposite direction of E. Further, the first repelling magnet 52 provides a repelling force between the first generating magnet 44 and the first repelling magnet 52 to force the first side 118 towards its resting position. As the first generating magnet 44 passes through the first electrically conductive coil 40 as described above, the first generating magnet 44 produces an alternating current which may be changed to a direct current in any suitable manner to be in electrical communication with an electrical device through the first electrical outputs 58 and to power the electrical device. In the event the drive mechanism is an electrical drive mechanism, the electrical current produced may also be utilized to offset the electrical load required to power the drive mechanism.

With continued reference to FIG. 6, as the U-shaped recess 100 of the pivot member 20C contacts the pivot rod 34D, the pivot rod 34D travels along the U-shaped recess 100. While the pivot rod 34D travels along the U-shaped recess 100, the coil spring 56J extends until the pivot rod 34D travels substantially along the entire contact surface of the U-shaped recess 100 at which point the pivot member 20C is in its extended position. As the pivot rod 34D disengages from the U-shaped recess 100, the coil spring 56J biases the pivot member 20B to its resting position. In one embodiment according to the present disclosure, as the first front mounting plate 22 and the first rear mounting plate 26 rotate, the securing mechanism 108 contacts the coil spring 56J which further extends the coil spring 56J before the coil spring 56J biases the pivot member 20C to its resting position.

Further, while the pivot rod 34D travels along the U-shaped recess 100, the second side 120 of the oscillating member 30 oscillates in an upward vertical direction between the top 62 of the frame 12 and the bottom 64 of the frame 12, shown at arrow D, until the pivot rod 34D travels substantially along the entire contact surface of the U-shaped recess 100 at which point the second side 120 is in its upper extended position. As the pivot rod 34D disengages from the U-shaped recess 100, the coil springs 56E, 56F, 56G and 56H bias the second side 120 of the oscillating member 30 towards its resting position. The same process repeats as the other pivot members 20A, 20B and 20D contact the pivot rod 34D.

With reference to FIG. 8, as the second side 120 of the oscillating member 30 oscillates in an upward vertical direction between the top 62 of the frame 12 and the bottom 64 of the frame 12, the lower leg 154 of the L-shaped lower portion 142 of the second side 120 moves in an upwardly and outwardly direction towards the right side 72 of the frame 12 and towards the outer end of upper leg 136 away from the second coil mount 38 as shown at arrow F. As the lower leg 154 of the L-shaped lower portion 142 of the second side 120 moves in direction F, the second generating magnet 46 moves through the second electrically conductive coil 42. As the second side 120 is biased towards its resting position, the second generating magnet 46 passes through the second electrically conductive coil 42 in the opposite direction of F. Further, the second repelling magnet 54 provides a repelling force between the second generating magnet 46 and the second repelling magnet 54 to force the second side 120 towards its resting position. As the second generating magnet 46 passes through the second electrically conductive coil 42 as described above, the second generating magnet 46 produces an alternating current which may be changed to a direct current in any suitable manner to be in electrical communication with an electrical device through the second electrical outputs 60 and to power the electrical device. In the event the drive mechanism is an electrical drive mechanism, the electrical current produced may also be utilized to offset the electrical load required to power the drive mechanism.

The drive mechanism continues to drive at least one of the drive wheels 14 and 16 to rotate the drive shaft 18, the first front mounting plate 22, the first rear mounting plate 26, the second front mounting plate 24, the second rear mounting plate 28 and the pivot members 20A, 20B, 20C, 20D, 20E, 20F, 20G and 20H as shown at arrow A at a rate which is suitably timed so that the first side 118 and the second side 120 of the oscillating member 30 oscillate in a synchronized manner. Thus, oscillator 10 provides a very efficient oscillating movement of oscillating member 30 which is initially driven by drive mechanism in order to produce electrical current via the first and second generating magnets 44 and 46 and the first and second electrically conductive coils 40 and 42. The electrical current may be used to assist in powering the drive mechanism or for any other suitable purpose as one of ordinary skill in the art would understand. It is noted that the pivot members 20A, 20B, 20C and 20D operate in a similar manner as pivot members 20E, 20F, 20G and 20H to oscillate the oscillating member 30.

In short, oscillator 10 is configured to smoothly translate the continuous counterclockwise rotational movement of the drive wheels 14 and 16, the drive shaft 18, the first front mounting plate 22, the first rear mounting plate 26, the second front mounting plate 24, the second rear mounting plate 28 and the pivot members 20A, 20B, 20C, 20D, 20E, 20F, 20G and 20H and the clockwise pivotal movement of the pivot members 20A, 20B, 20C, 20D, 20E, 20F, 20G and 20H to pivotal back and forth movement of the oscillating member 30 as described above.

Figure 9:
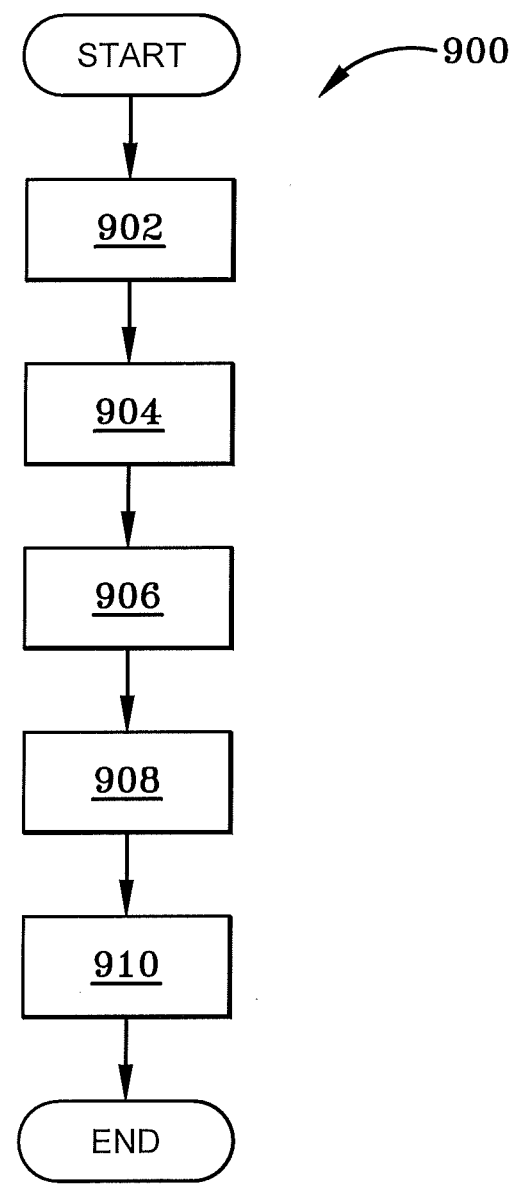
FIG. 9 (FIG. 9) is a flow chart depicting an exemplary method of generating power in accordance with one aspect of the present disclosure.

In accordance with one aspect of the present disclosure, reference is made to a method of generating power depicted in the flowchart of FIG. 9. The method of generating power 900 first rotates a drive shaft 18, which is shown generally at 902. The rotation of the drive shaft 18 causes at least two pivot members 20A and 20C to rotate, which is shown generally at 904. The at least two pivot members 20A and 20C contact the oscillating member 30 causing the oscillating member 30 to oscillate, which is shown generally at 906. Oscillation of the oscillating member 30 causes the at least one generating magnet 44 to move through at least one electrically conductive member 40, which is shown generally at 908. Electricity is generated from the oscillating movement of the at least one generating magnet 44 through the electrically conductive member 40, which is shown generally at 910.

It is noted that the various magnets described herein may be permanent magnets or electromagnets. It is also noted that various changes may be made to oscillator 10 which are within the scope of the present disclosure. One of such changes includes changing the design of the frame 12 in any suitable manner. Other variations will be evident to one skilled in the art.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the disclosure is not limited to the exact details shown or described.

The invention claimed is:

1. An apparatus comprising:
   a rotatable drive shaft;
   at least two pivot members which rotate with the drive shaft;
   at least one oscillating member which is pivotable back and forth in an oscillating manner; and
   at least one rod mounted on the at least one oscillating member which is movable in response to rotational and pivotal movement of the at least two pivot members so as to cause the oscillating member to pivot back and forth in an oscillating manner.

2. The apparatus of claim 1, wherein the drive shaft is rotatable about a first axis; and the at least one oscillating member oscillates about the first axis.

3. The apparatus of claim 1, wherein the at least two pivot members are pivotable about a second axis and a third axis respectively.

4. The apparatus of claim 1, further comprising:
   at least one biasing mechanism operatively connected to the oscillating member to control oscillating movement of the at least one oscillating member.

5. The apparatus of claim 4, further comprising:
   at least one rotatable drive wheel operatively connected to the drive shaft; and
   at least one mounting plate carrying the at least two pivot members and operatively connected to the drive shaft; and wherein rotation of the drive wheel causes rotation of the drive shaft about a first axis and rotation of the drive shaft causes rotation of the at least one mounting plate and revolution of at least two pivot members about the first axis.

6. The apparatus of claim 5, further comprising:
   a frame;
   at least one generating magnet supported by the oscillating member; and
   at least one electrically conductive member supported by the frame and in which an electric current is produced in response to oscillating movement of the at least one generating magnet.

7. The apparatus of claim 6, wherein the at least one oscillating member is pivotable about the first axis and comprises a first side having an upper portion and a lower portion having an upper leg which extends radially outwardly from the first axis and a lower leg which extends radially inwardly toward the first axis and the at least one generating magnet is on the lower leg.

8. The apparatus of claim 7 wherein the at least one oscillating member comprises a second side having an upper portion and a lower portion having an upper leg which extends radially outwardly from the first axis and a lower leg which extends radially inwardly toward the first axis and the at least one generating magnet is on the lower leg.

9. The apparatus of claim 8, further comprising:
   at least one repelling magnet mounted adjacent the at least one electrically conductive member for repelling the at least one generating magnet to limit oscillating travel of the at least one oscillating member in one direction.

10. The apparatus of claim 9, further comprising:
    a drive mechanism operatively connected to the at least one rotatable drive wheel for driving rotation of the at least one rotatable drive wheel.

11. The apparatus of claim 10, further comprising:
    a rotational output on the drive mechanism; and wherein the rotational output is operatively connected to the at least one rotatable drive wheel and the drive shaft.

12. The apparatus of claim 11, wherein the at least one electrically conductive member comprises a coil circumscribing a space; and the at least one generating magnet is oscillatingly movable within the space.

13. The apparatus of claim 12, wherein the at least one biasing mechanism is a coil spring.

14. The apparatus of claim 13, wherein the at least one oscillating member is weight balanced about the first axis.

15. The apparatus of claim 14, further comprising:
an electric motor in electrical communication with the at least one electrically conductive member.

16. The apparatus of claim 15, wherein the electric motor is operatively connected to the at least one drive wheel for driving rotation of the at least one drive wheel.

17. A method of generating power comprising:
providing at least one rotatable drive wheel operatively connected to a drive shaft;
providing at least one mounting plate carrying at least two pivot members and operatively connected to the drive shaft;
rotating the at least one rotatable drive wheel, wherein rotation of the drive wheel causes rotation of the drive shaft about a first axis and rotation of the drive shaft causes rotation of the at least one mounting plate and revolution of at least two pivot members about the first axis;
controllingly oscillating at least one oscillating member with at least one biasing member;
moving at least one generating magnet through at least one electrically conductive member; and
generating electricity from oscillating movement of the at least one generating magnet; and wherein oscillating the at least one oscillating member is accomplished by pivoting at least two pivot members into contact with the at least one oscillating member so as to oscillate the at least one oscillating member.

18. The method of generating power of claim 17, further comprising:
providing at least one repelling magnet;
positioning the at least one repelling magnet adjacent the at least one electrically conductive member for repelling the at least one generating magnet to limit oscillating travel of the at least one oscillating member in one direction.

19. The method of claim 18, further comprising:
driving rotation of the at least one rotatable drive wheel with a drive mechanism.

20. The method of claim 19, wherein the at least one electrically conductive member comprises a coil circumscribing a space; the method further comprising:
oscillatingly moving the at least one generating magnet within the space.

* * * * *